US010072687B2

(12) United States Patent
Jiang

(10) Patent No.: US 10,072,687 B2
(45) Date of Patent: Sep. 11, 2018

(54) BOARD INTERLOCKING STRUCTURE

(71) Applicant: Yixiang Blow Molding Furniture (Ningbo) Co., Ltd., Yuyao (CN)

(72) Inventor: Yixiang Jiang, Yuyao (CN)

(73) Assignee: YIXIANG BLOW MOLDING FURNITURE (NINGBO) CO., LTD., Yuyao (CN)

( * ) Notice: Subject to any disclaimer, the term of this patent is extended or adjusted under 35 U.S.C. 154(b) by 0 days.

(21) Appl. No.: 15/401,072

(22) Filed: Jan. 8, 2017

(65) Prior Publication Data
US 2017/0343022 A1    Nov. 30, 2017

(30) Foreign Application Priority Data

May 27, 2016    (CN) .......................... 2016 1 0378441

(51) Int. Cl.
*F16B 5/00*    (2006.01)
*B65D 25/00*    (2006.01)

(52) U.S. Cl.
CPC ............ *F16B 5/0036* (2013.01); *B65D 25/00* (2013.01)

(58) Field of Classification Search
CPC .................................................... F16B 5/0036
USPC ............................................................ 428/57
See application file for complete search history.

(56) References Cited

U.S. PATENT DOCUMENTS

2004/0200832 A1* 10/2004 Moon ................ B65D 11/1873
                                                         220/4.28

* cited by examiner

*Primary Examiner* — Brent T O'Hern
(74) *Attorney, Agent, or Firm* — Platinum Intellectual Property LLP

(57) ABSTRACT

A board interlocking structure is disclosed herein, comprising a first board, a second board, and a third board, wherein a coupling structure configured to connect to the other two boards is integrally formed on each of the first board, the second board, and the third board. The first board, the second board, and the third board are configured to interlock with one another via the coupling structure. The present disclosure is advantageous in the following aspects: it provides a coupling structure integrally formed on each board that is capable of connecting to the other two boards, allowing the three boards to be interlocked together. The board interlocking structure thus provides a simple, fast and robust interlock mechanism. Further, as no fasteners are required for connecting the boards, the board interlocking structure leads to easy assembly and disassembly of the three boards.

18 Claims, 11 Drawing Sheets

BOARD INTERLOCKING STRUCTURE

RELATED APPLICATIONS

This application claims priority to Chinese patent application 201610378441.4, filed Can 27, 2016, and entitled "BOARD INTERLOCKING STRUCTURE", the disclosure of which is hereby incorporated herein by reference in its entirety for all purposes.

FIELD OF THE INVENTION

The present application relates to a board interlocking structure.

BACKGROUND

Many existing furniture products are formed by a plurality of boards assembled together. During assembling of such furniture, it is typically required to join and fix the boards with screws, the installation thus relatively complicated. For example, to assemble a typical box of the prior art, people have to install and fix fasteners such as screws onto a baseboard, four side boards, and a cover board with the help of a screwdriver, so that the baseboard, side boards, and cover board can be fitted together. Not only this process is time-consuming and laborious, it also leads to low assembly efficiency. Consequently, the screws need to be loosened separately to disassemble the box, which is highly inconvenient. Moreover, for boxes fastened by screwed connections, mounting holes must be reserved in advance on the baseboard, side boards, and cover board during their manufacture. For precise assembling, errors in the positions of such reserved mounting holes are unforgiven, as the box cannot be put together. In addition, for some boxes, there are pre-embedded fasteners in the reserved mounting holes. Therefore, additional follow-up manufacturing processes are required after forming the boards to install the pre-embedded fasteners. Such installations are usually done by low-efficiency manual operations. Even though there are products that can be assembled without fasteners like screws, it remains a challenge to provide a fast and effective interlocking mechanism for connecting multiple boards with robust structures.

SUMMARY OF THE INVENTION

In view of the prior arts above, one technical solution to be solved by the present disclosure is to provide a board interlocking structure with simple and firm structure.

One technical solution to solve the above problem is a board interlocking structure comprising a first board, a second board, and a third board, wherein a coupling structure capable of connecting to the other two boards is integrally formed on each one of the first board, the second board, and the third board, and the first board, the second board, and the third board are capable of interlocking with one another via the coupling structure. According to some embodiments, the coupling structure further comprises a first insert connection structure, a second insert connection structure and a third insert connection structure.

According to some embodiments, a first insert connection structure allowing the first and second boards only to slide along the insertion direction can be formed between the first board and the second board; a second insert connection structure allowing the first and third boards only to slide along the insertion direction can be formed between the first board and the third board; and a third insert connection structure allowing the second and third boards only to slide along the insertion direction can be formed between the second board and the third board. In the case that the first board, the second board, and the third board are in insert connection with one another, the third board can be capable of preventing relative displacement of the first board relative to the second board and preventing relative displacement of the first board relative to the third board.

According to some embodiments, the first, second, and third boards are configured perpendicular to one another. A horizontal retaining groove along a front-rear direction with an inward opening can be formed at the bottom of the first board, and a horizontal rib along a front-rear direction capable of forming an insert connection with the horizontal retaining groove can be formed at the corresponding side of the second board, the horizontal retaining groove and horizontal rib forming the first insert connection structure. A vertical retaining groove along an up-down direction with an inward opening can be formed on the front or rear portion of the first board, and a vertical rib adaptive to couple with the vertical retaining groove can be formed on the corresponding side portion of the third board, the vertical retaining groove and vertical rib forming the second insert connection structure. An insert slot can be formed on the front or rear side portion of the second board, and a pin for forming an insert connection with the insert slot can be integrally formed at the bottom of the third board, the insert slot and the pin forming the third insert connection structure.

According to some embodiments, the vertical and horizontal retaining grooves can be dovetail grooves or T-shaped grooves. Additionally, the horizontal and vertical retaining grooves can be implemented in any other form of retaining grooves.

According to some embodiments, the horizontal retaining groove can be closed at the front end or the rear end; the vertical retaining groove can be closed at the lower end; a lower step can be formed at the corner at the top portion of the first board; an upper end of the vertical retaining groove opens at the corresponding lower step; a lug protruding from the vertical rib can be formed at the corresponding corner at the top portion of the third board, the lug being pushed against the lower step when the corresponding vertical rib and vertical retaining groove are mated by insertion. As one end of the vertical and horizontal retaining grooves is closed, it is possible for the boards to properly mate with the baseboard by insertion. Furthermore, upward displacement of the first board can be prevented when the lugs are pushed against the lower step.

According to some embodiments, the pin can extend downward from the bottom of the third board and a buckling portion bending inward can be formed at the bottom of the pin. The buckling portion can be buckled reversely on an internal edge of the insert slot when the pin is inserted into the corresponding insert slot. In this way, when the second and third boards are installed, there is no gap remaining along the inner side edge of the insert slot.

To further strengthen the insert-connection structure between the three boards, strip-shaped grooves distributed in an alternate manner with the insert slots can be formed on the second board, and bar-shaped ribs distributed in an alternate manner with the pin can be formed at the bottom of the third board. When the pin is inserted into the corresponding insert slot, the bar-shaped rib can be inserted into the corresponding strip-shaped groove.

Compared with the prior art, the present disclosure is advantageous in the following aspects: it provides a coupling structure integrally formed on each board that is capable of connecting to the other two boards, allowing the three boards to be securely interlocked together. The board interlocking structure thus provides a simple, fast and robust interlock mechanism. Further, as no fasteners are required for connecting the boards, the board interlocking structure leads to easy assembly and disassembly of the three boards.

DETAILED DESCRIPTION OF EMBODIMENTS

The present disclosure is described in details below with reference to embodiments as shown in the attached figures.

Figure 1:
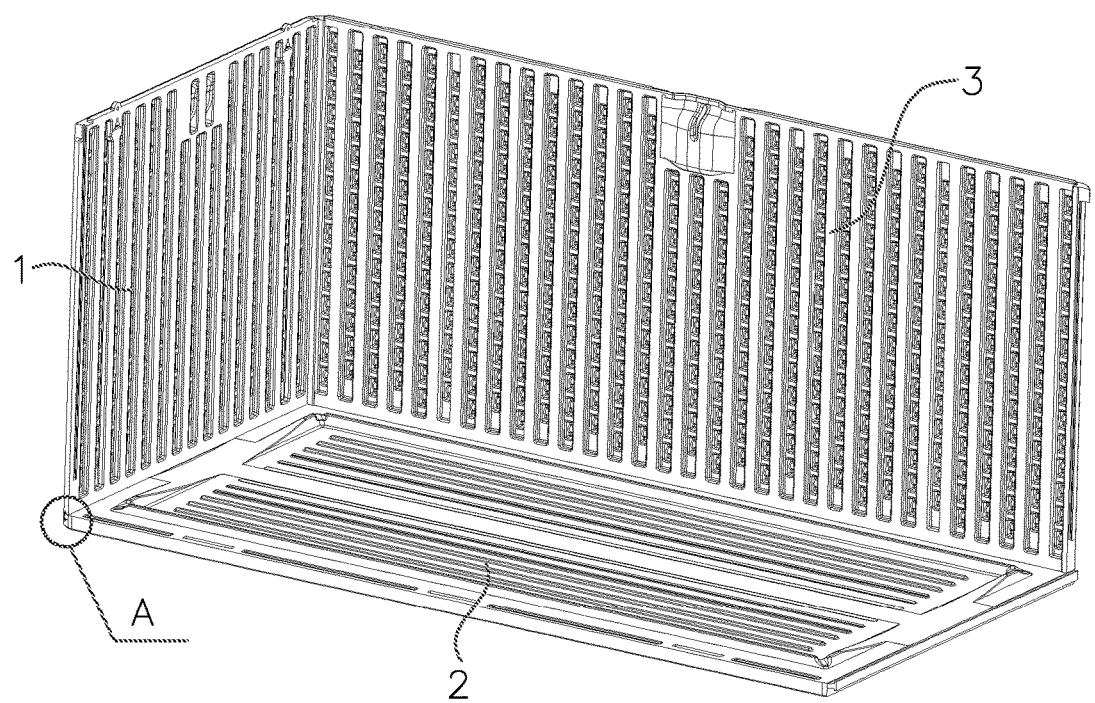
FIG. 1 is a structural schematic of one embodiment according to the present disclosure.
Figure 2:
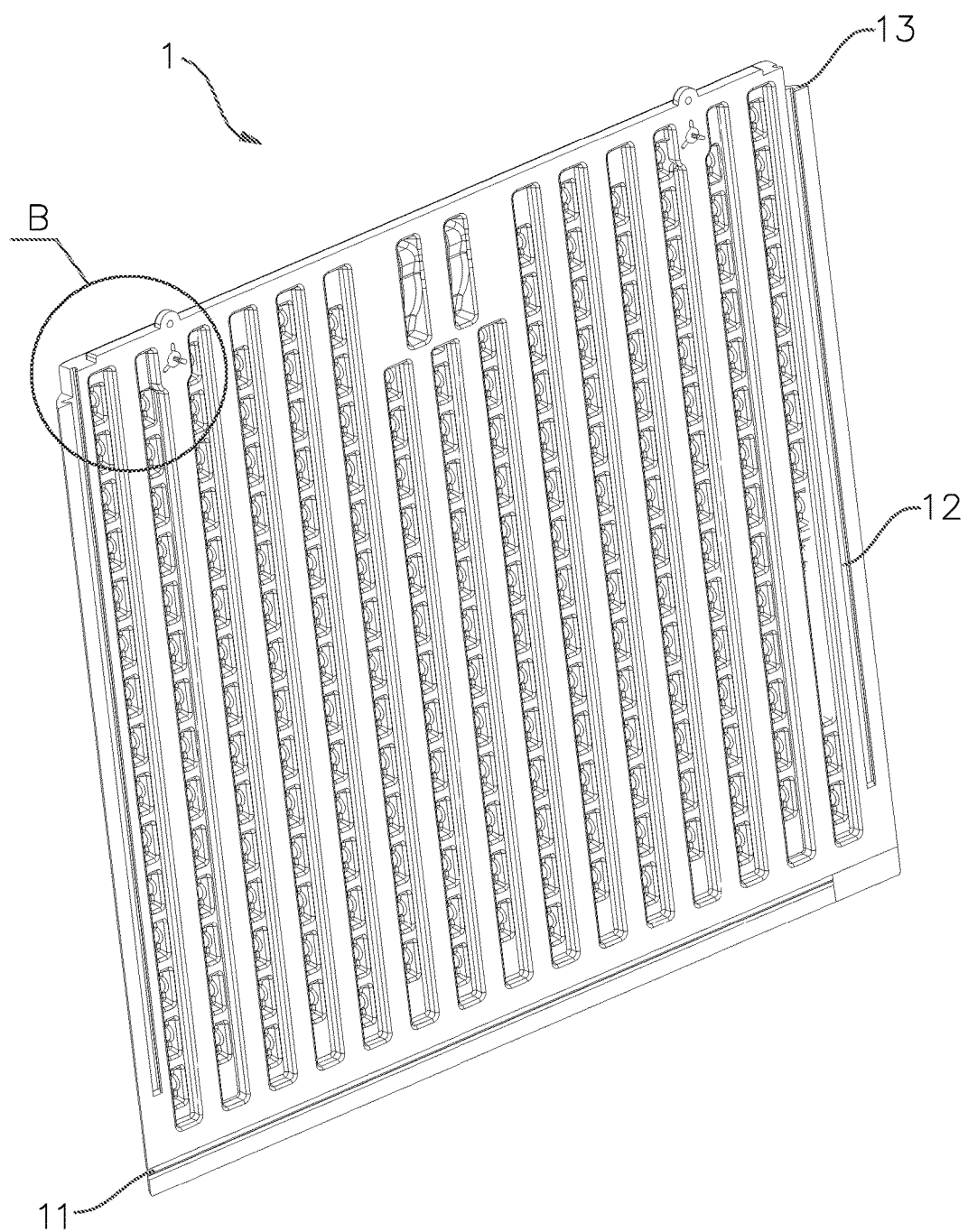
FIG. 2 is a structural schematic of a first board according to one embodiment of the present disclosure.
Figure 3:
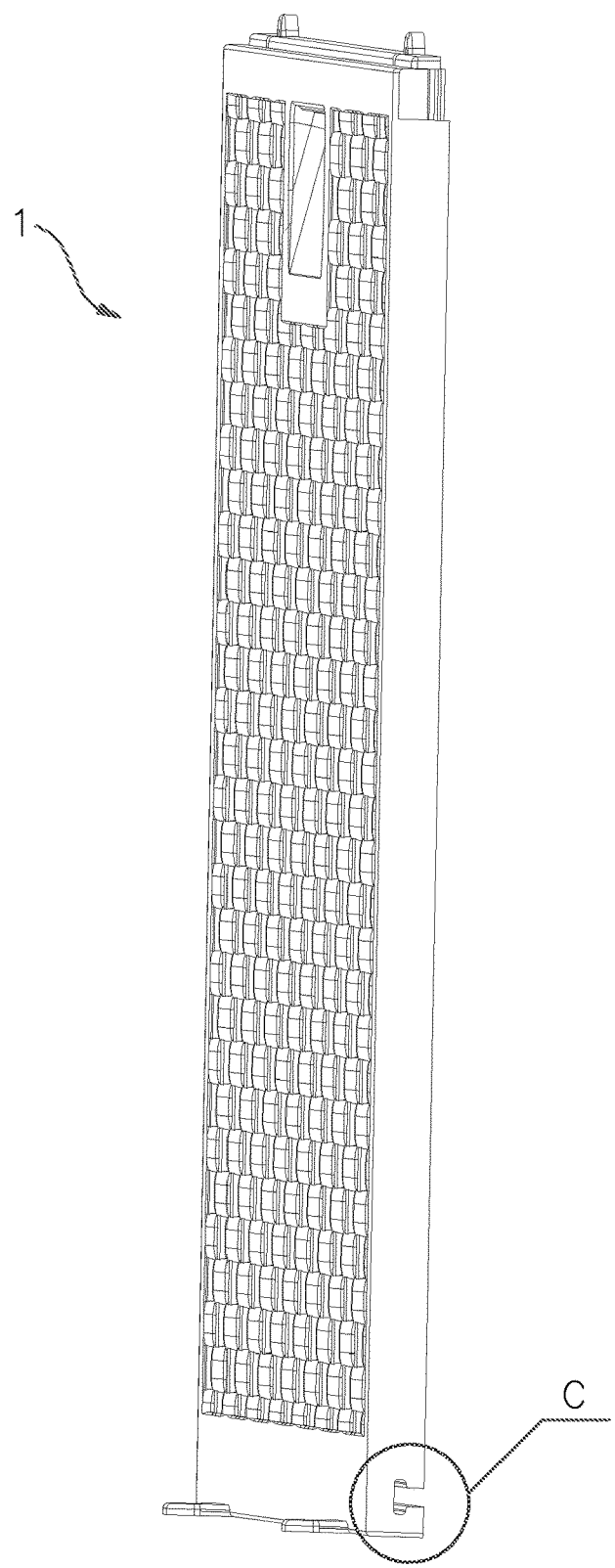
FIG. 3 is a structural schematic from another angle of a first board according to one embodiment of the present disclosure.
Figure 4:
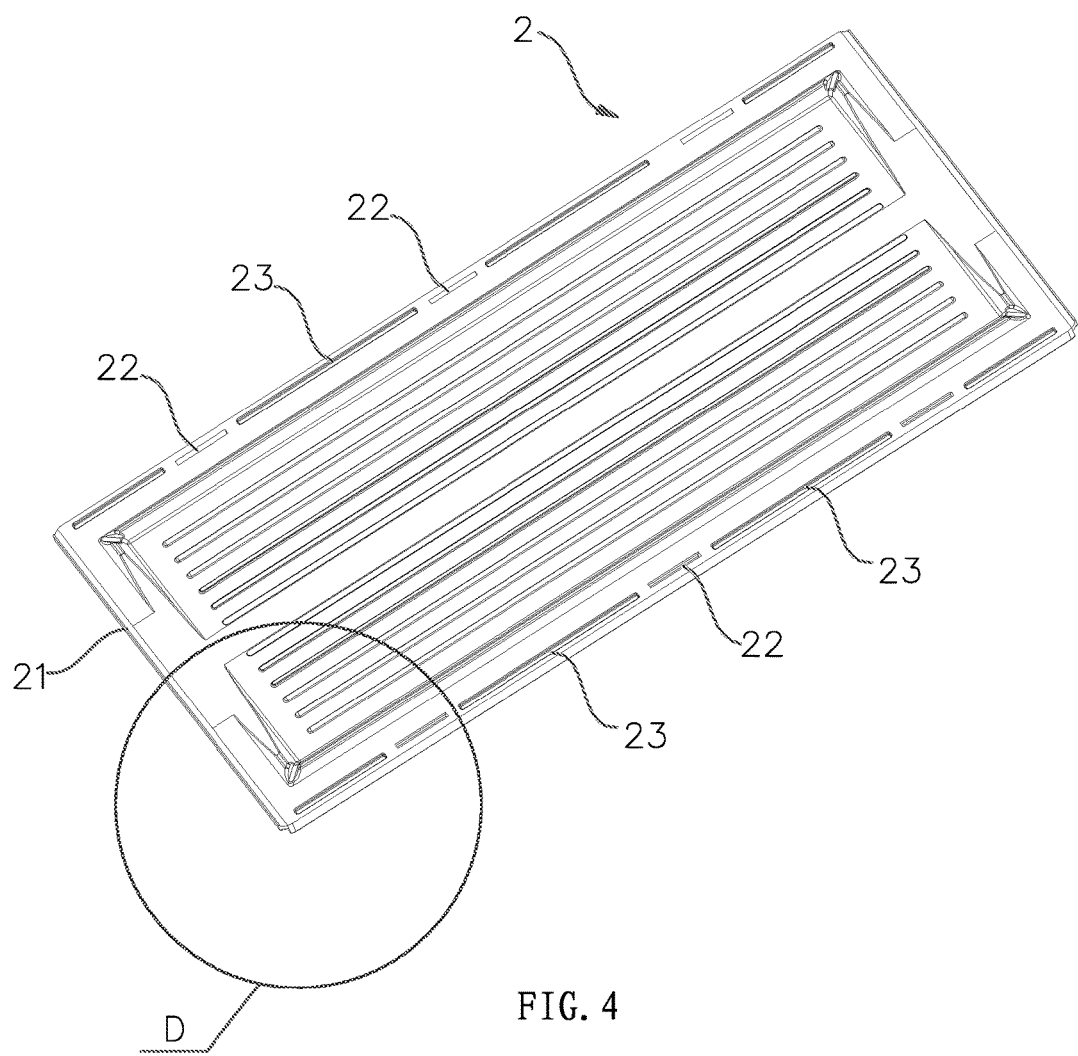
FIG. 4 is a structural schematic of a second board in one embodiment according to the present disclosure.
Figure 5:
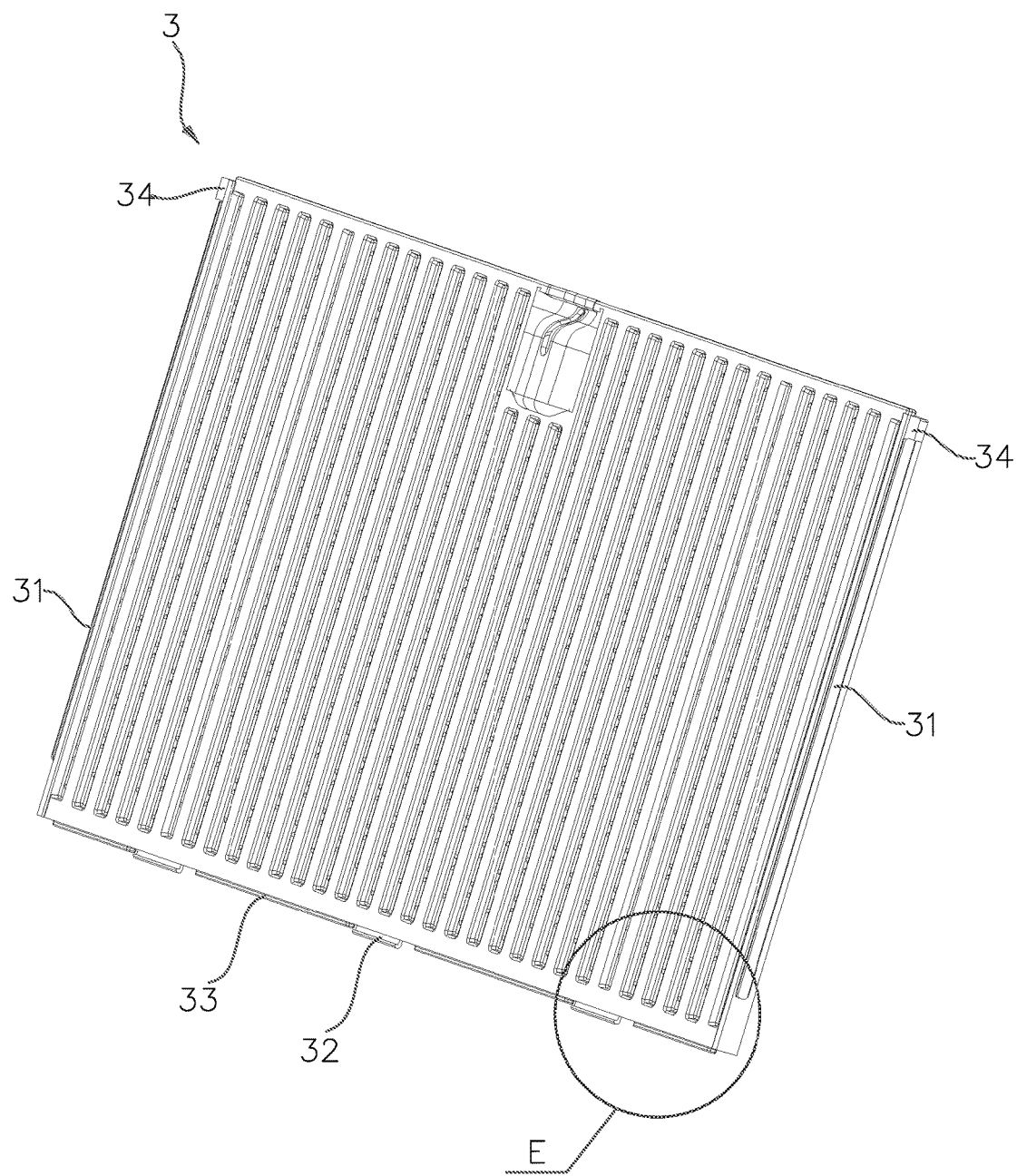
FIG. 5 is a structural schematic of a third board in one embodiment according to the present disclosure.
Figure 6:
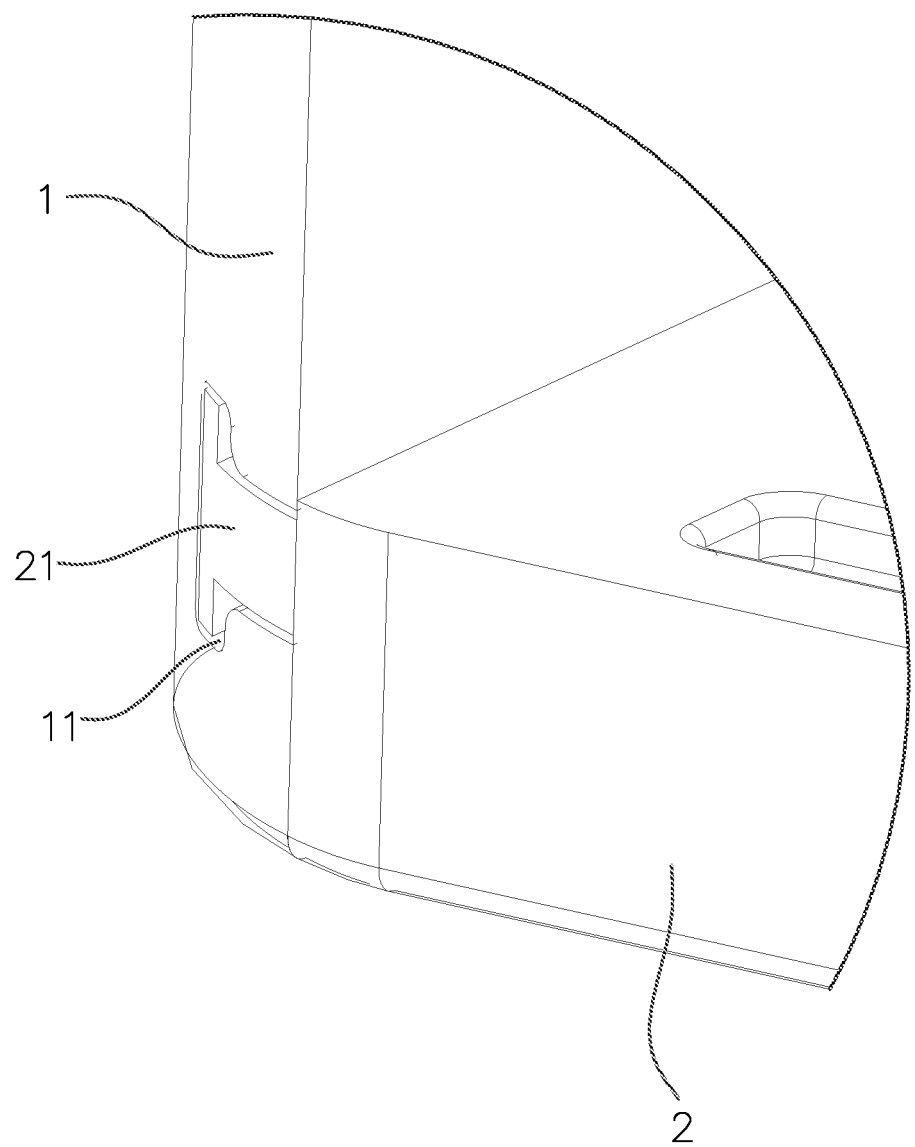
FIG. 6 is an enlarged schematic of the portion A in FIG. 1.
Figure 7:
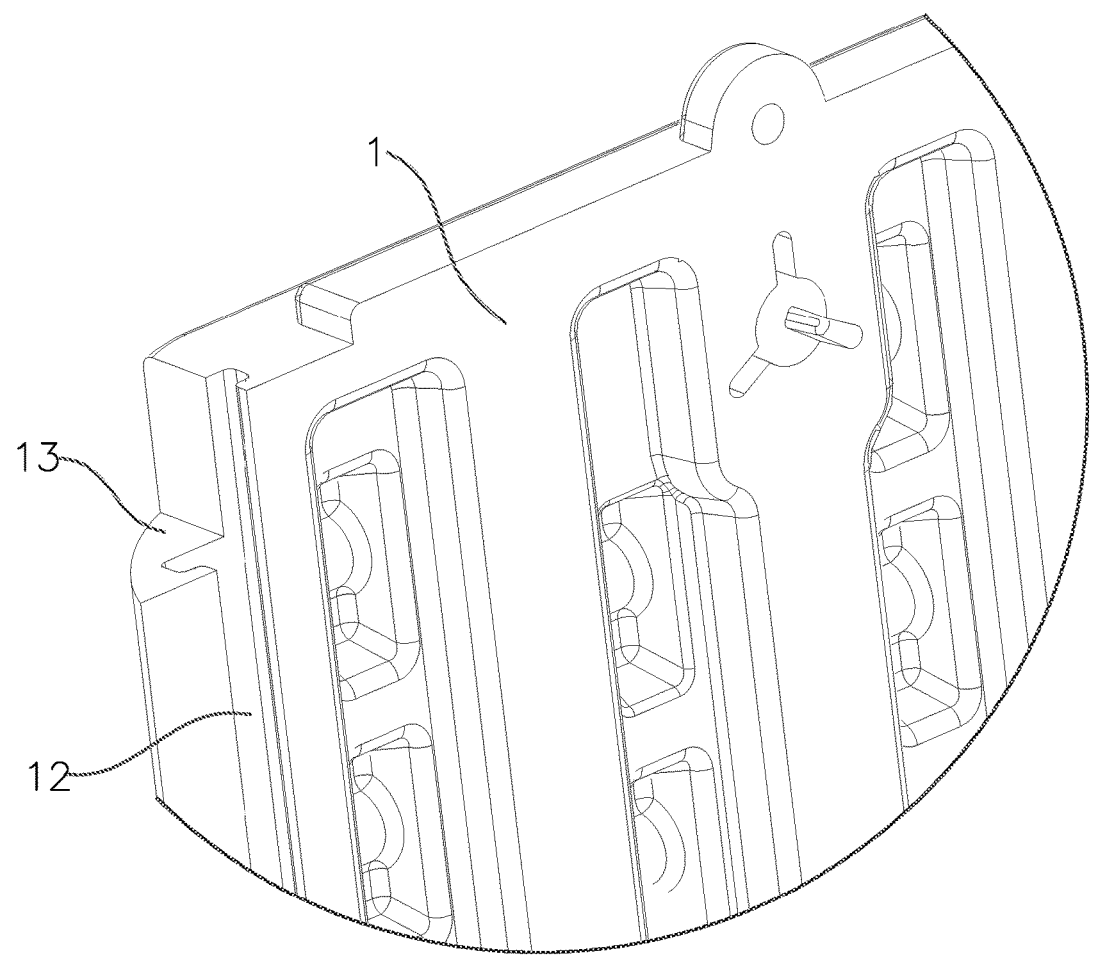
FIG. 7 is an enlarged schematic of the portion B in FIG. 2.
Figure 8:
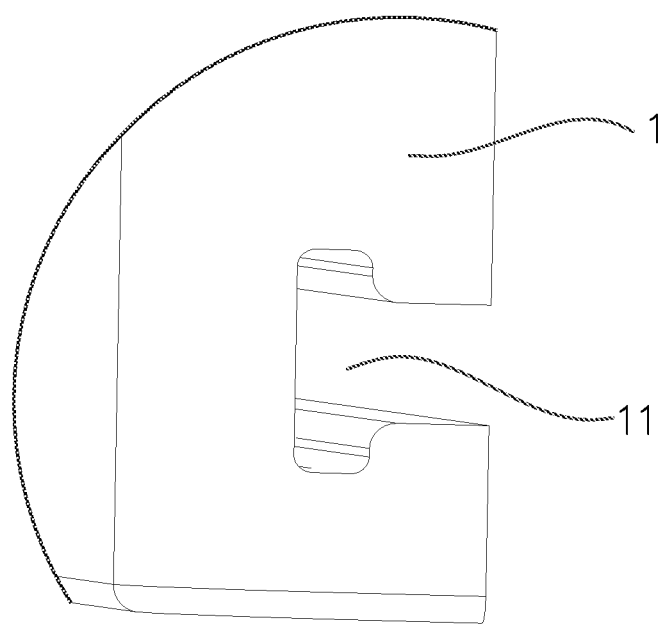
FIG. 8 is an enlarged schematic of the portion C in FIG. 3.
Figure 9:
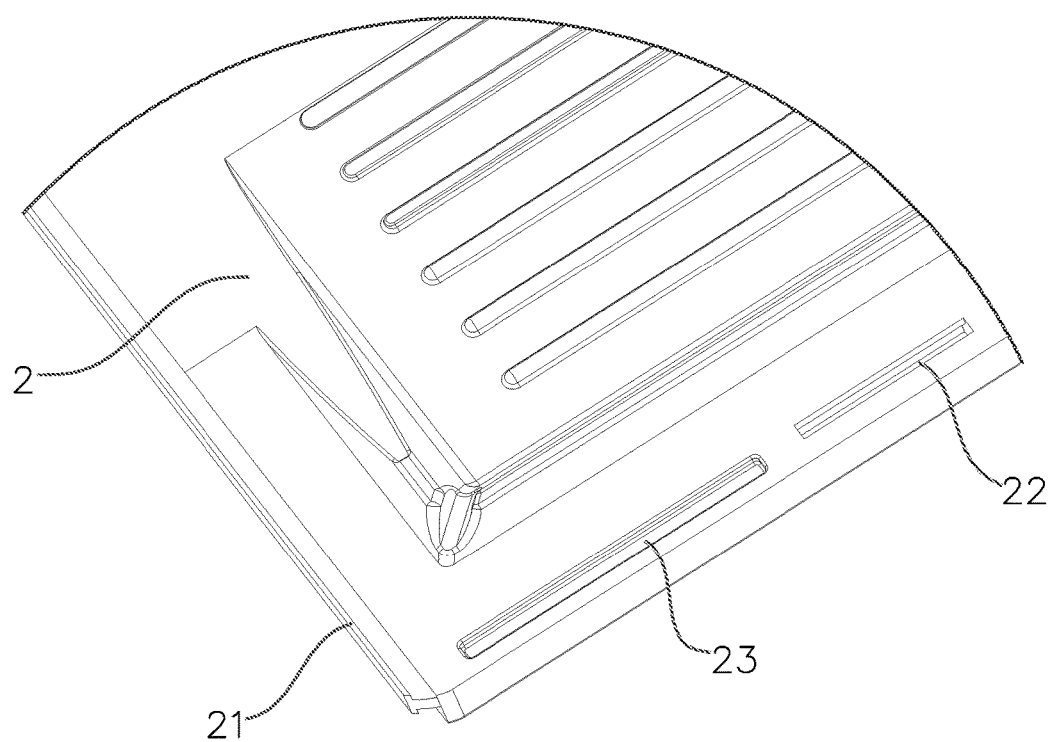
FIG. 9 is an enlarged schematic of the portion D in FIG. 4.
Figure 10:
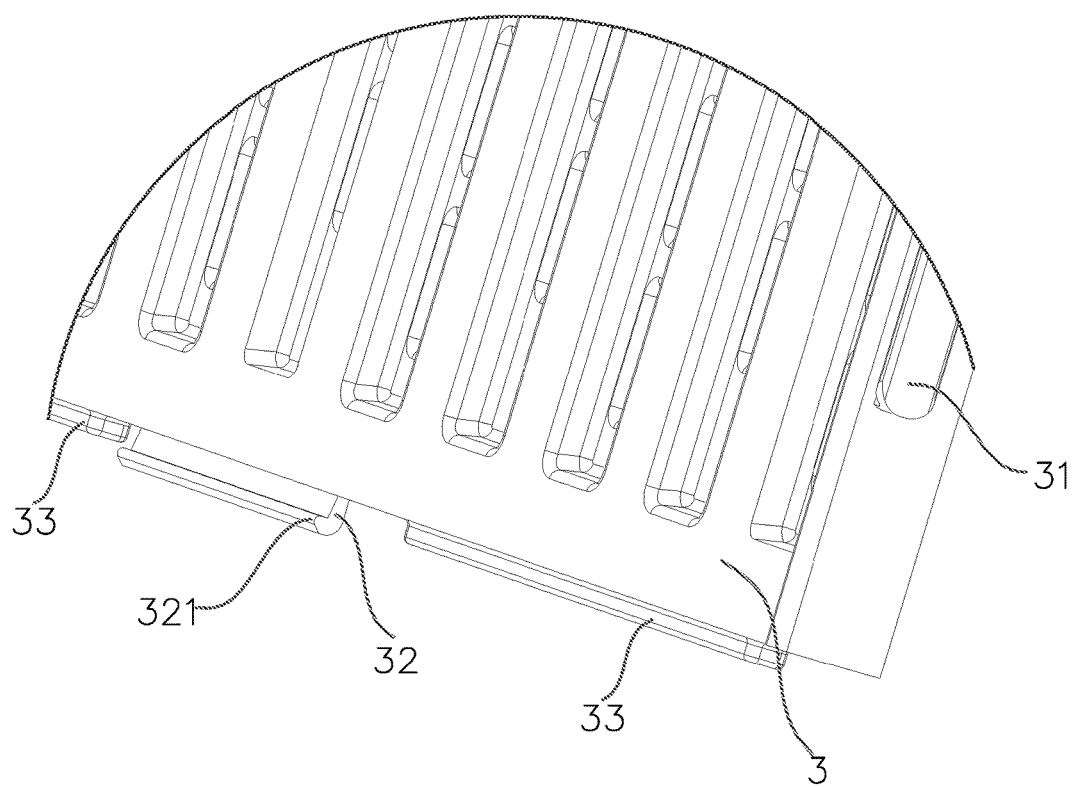
FIG. 10 is an enlarged schematic of the portion E in FIG. 5.

As shown in FIG. 1, the board interlocking structure of this embodiment comprises a first board 1, a second board 2, and a third board 3, wherein a coupling structure capable of connecting to the other two boards is integrally formed on each one of the three boards. The coupling structure further comprises a first insert connection structure, a second insert connection structure and a third insert connection structure.

A first insert connection structure allowing the first and second boards only to slide along the insertion direction is formed between the first board 1 and the second board 2. A second insert connection structure allowing the first and third boards only to slide along the insertion direction is formed between the first board 1 and the third board 3. A third insert connection structure allowing the second and third boards only to slide along the insertion direction is formed between the second board 2 and the third board 3. Further, when the first board 1, the second board 2, and the third board 3 are in insert connection with one another, the third board 3 is capable of preventing relative displacement of the first board 1 relative to the second board 2 and preventing relative displacement of the first board 1 relative to the third board 3. Therefore, the first, second, and the third insert connection structures constitute the coupling structure above, and the first board 1, the second board 2, and the third board 3 are configured to securely interlock with one another via the coupling structure.

As shown in FIGS. 2 to 10, the first board 1, second board 2, and third board 3 are configured perpendicular to one another. A horizontal retaining groove 11 along a front-rear direction with an inward opening is formed at a bottom of the first board 1, wherein the horizontal retaining groove 11 can be a dovetail groove or a T-shaped groove. A horizontal rib 21 along a front-rear direction capable of forming an insert connection with the horizontal retaining groove is formed at a corresponding side of the second board 2. The horizontal retaining groove 11 and the horizontal rib 21 form the first insert connection structure. A vertical retaining groove 12 along an up-down direction with an inward opening is formed on a front or rear portion of the first board 1, wherein the vertical retaining groove 12 can be a dovetail groove or a T-shaped groove. A vertical rib 31 adaptive to couple with the vertical retaining groove is formed on a corresponding side portion of the third board 3. The vertical retaining groove 12 and the vertical rib 31 form the second insert connection structure. An insert slot 22 is formed on a front or rear side portion of the second board 2, and a pin 32 for forming an insert connection with the insert slot 22 is integrally formed at a bottom of the third board 3, the insert slot 22 and the pin 32 forming the third insert connection structure.

Furthermore, the horizontal retaining groove 11 is closed at a front end or a rear end, and the vertical retaining groove 12 is closed at a lower end. A lower step 13 is formed at a corner at a top portion of the first board 1. An upper end of the vertical retaining groove 12 opens at a corresponding lower step. A lug 34 protruding from the vertical rib 31 is formed at a corresponding corner at a top portion of the third board 3. The lug 34 is pushed against the lower step 13 when the corresponding vertical rib 31 and vertical retaining groove 12 are mated by insertion. Therefore, it is possible for the boards to properly mate with the baseboard by insertion. Furthermore, upward displacement of the first board 1 can be prevented when the lugs 34 are pushed against the lower step 13.

In the present embodiment, the pin 32 extends downward from a bottom of the third board 3 and a buckling portion 321 bending inward is formed at a bottom of the pin 32; and, the buckling portion 321 is buckled reversely on an internal edge of the insert slot 22 when the pin 32 is inserted into the corresponding insert slot 22. In addition, a strip-shaped groove 23 distributed in an alternate manner with the insert slot 22 is formed on the second board 2, and a bar-shaped rib 33 distributed in an alternate manner with the pin 32 is formed at a bottom of the third board 3. When the pin 32 is inserted into a corresponding insert slot 22, the bar-shaped rib 33 is inserted into the corresponding strip-shaped groove 23, allowing a more robust assembly structure between the second board 2 and the third board 3.

During assembly, the first board 1 is first fully inserted into the second board 2 in a front-rear direction. Then, the third board 3 is fully inserted into the first board 1 in an up-down direction. Meanwhile, the pin 32 is inserted into a corresponding insert slot 22, and the lug 34 abuts against the lower step 13, so that the first board 1, the second board 2, and the third board 3 are connected together and the interlocking among the three boards are formed.

Figure 11:
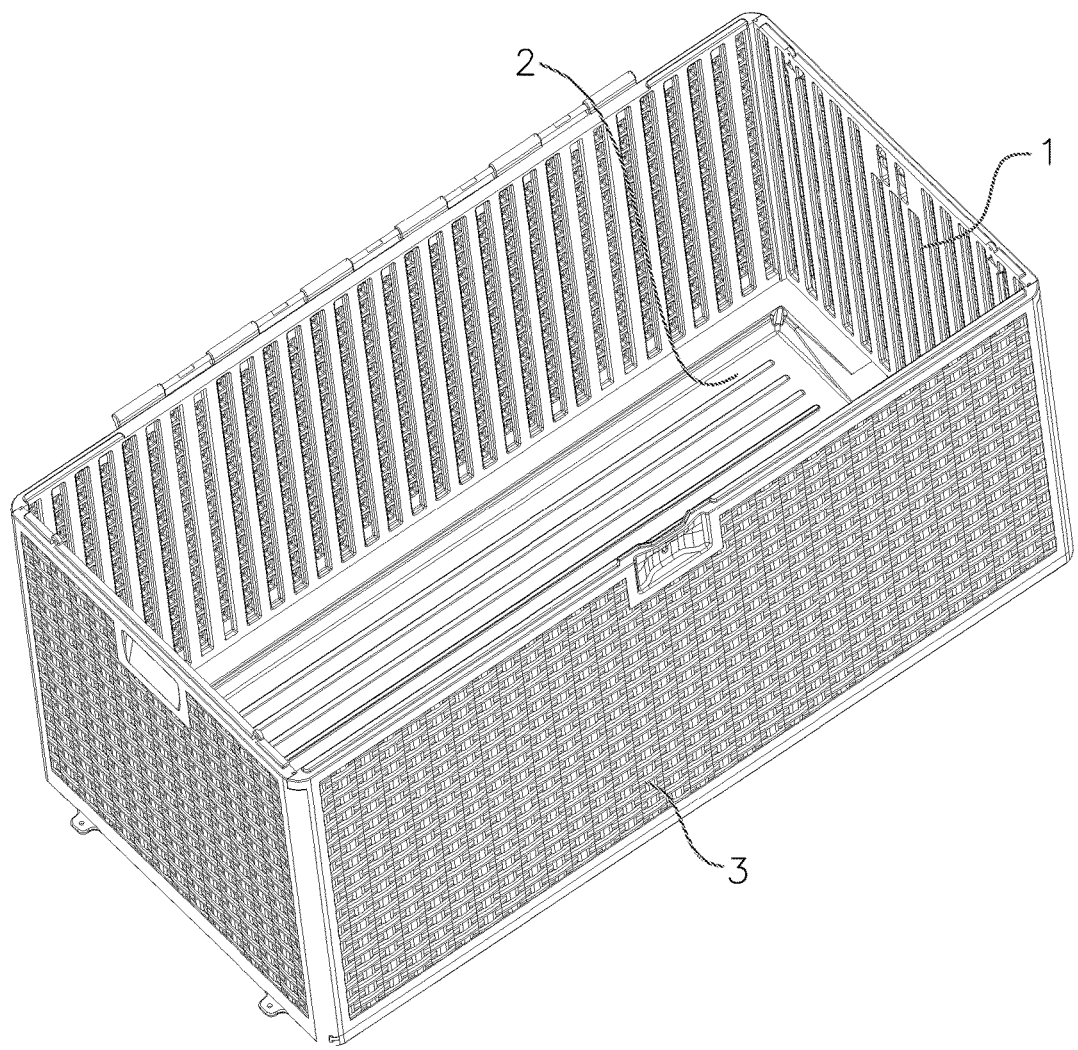
FIG. 11 is a structural schematic of a box structure using the board interlocking structure according to one embodiment of the present disclosure with the cover board reslided.

As shown in FIG. 11, the board interlocking structure can be applied to a storage structure such as boxes. In the present embodiment, the right board is considered as the first board 1, the baseboard as the second board 2, and the front board as the third board 3. Additionally, any three perpendicular boards of the box (except for the cover board) can be considered as the first, second, and third boards and can employ the board interlocking structure of the present embodiment. By using the board interlocking structure among the boards, no fasteners are required during the box assembly, allowing the assembly process to be fast and convenient.

The embodiments described above are only some of the preferred embodiments of the present disclosure. It would be understood by a person skilled in the art that various changes and modifications can be made to the embodiments described herein without departing from the scope and spirit of the present disclosure. Such changes and modifications should be considered as within the protection scope claimed by the present disclosure.

What is claimed is:

1. A board interlocking structure, comprising:
a first board (1);
a second board (2); and
a third board (3),
wherein a coupling structure capable of connecting to the second board (2) and third board (3) is integrally formed on each one of the first board (1), the second board (2), and the third board (3), and wherein the first board (1), the second board (2), and the third board (3) are capable of interlocking with one another via the coupling structure;
wherein the coupling structure further comprises:
a first insert connection structure between the first board (1) and the second board (2) allowing the first board (1) and second board (2) only to slide along an insertion direction, wherein the first insert connection structure further comprises:
a horizontal retaining groove (12) with an inward opening, the horizontal retaining groove (12) being one of a dovetail groove and a T-shape groove; and
a horizontal rib configured to form the first insert-connection structure with the horizontal retaining groove;
a second insert connection structure between the first board (1) and the third board (3) allowing the first board (1) and third board (3) only to slide along the insertion direction; and
a third insert connection structure between the second board (2) and the third board (3) allowing the second board (2) and third board (3) only to slide along the insertion direction;
wherein, when the first board (1), the second board (2), and the third board (3) are in insert connection with one another, the third board (3) is configured to prevent relative displacement of the first board (1) relative to the second board (2) and prevent relative displacement of the first board (1) relative to the third board (3).

2. The board interlocking structure of claim 1, wherein the first board (1), the second board (2), and third board (3) are configured perpendicular to one another; a vertical retaining groove (11) along an up-down direction with an inward opening is formed on a front or rear portion of the first board (1), and a vertical rib (31) adaptive to couple with the vertical retaining groove (11) is formed on a corresponding side portion of the third board (3), the vertical retaining groove (11) and the vertical rib (31) forming the second insert connection structure; and, an insert slot (22) is formed on a front or rear side portion of the second board (2), and a pin (32) for forming an insert connection with the insert slot (22) is integrally formed at a bottom of the third board (3), the insert slot (22) and the pin (32) forming the third insert connection structure.

3. The board interlocking structure of claim 2, wherein the vertical retaining groove (11) and horizontal retaining groove (12) are dovetail grooves or T-shaped grooves.

4. The board interlocking structure of claim 2, wherein the horizontal retaining groove (12) is closed at a front end or a rear end; the vertical retaining groove (11) is closed at a lower end; a lower step (13) is formed at a corner at a top portion of the first board (1); an upper end of the vertical retaining groove (11) opens at a corresponding lower step; a lug (34) protruding from the vertical rib (31) is formed at a corresponding corner at a top portion of the third board (3), the lug (34) being pushed against the lower step (13) when the corresponding vertical rib (31) and vertical retaining groove (11) are mated by insertion.

5. The board interlocking structure of claim 2, wherein the pin (32) extends downward from a bottom of the third board (3) and a buckling portion (321) bending inward is formed at a bottom of the pin (32); and, the buckling portion (321) is buckled reversely on an internal edge of the insert slot (22) when the pin (32) is inserted into the corresponding insert slot (22).

6. The board interlocking structure of claim 2, wherein a strip-shaped groove (23) distributed in an alternate manner with the insert slot (22) is formed on the second board (2), and a bar-shaped rib (33) distributed in an alternate manner with the pin (32) is formed at a bottom of the third board (3); and, when the pin (32) is inserted into a corresponding insert slot (22), the bar-shaped rib (33) is inserted into the corresponding strip-shaped groove (23).

7. A board interlocking structure, comprising:
a first board (1) related to a first insert connection structure;
a second board (2) related to a second insert connection structure; and
a third board (3) related to a third insert connection structure,
wherein the first insert connection structure, the second insert connection structure and the third insert connection structure are configured to securely interlock the first board (1), the second board (2) and the third board (3), wherein the first board (1), the second board (2) and the third board (3) are perpendicular to each other, and
wherein the first insert connection structure between the first board (1) and the second board (2) allows the first (1) and second board (2) only to slide along an insertion direction, wherein the first insert connection structure further comprises:
a horizontal retaining groove (12) with an inward opening, the horizontal retaining groove (12) being one of a dovetail groove and a T-shape groove; and
a horizontal rib configured to form the first insert-connection structure with the horizontal retaining groove;
wherein the second insert connection structure between the first board (1) and the third board (3) allows the first board (1) and third board (3) only to slide along the insertion direction; and
wherein the third insert connection structure between the second board (2) and the third board (3) allows the second board (2) and third board (3) only to slide along the insertion direction.

8. The board interlocking structure of claim 7, wherein the second insert connection structure further comprises a vertical retaining groove (11) on the first board (1) and a vertical rib (31) on the third board (3).

9. The board interlocking structure of claim 7, wherein the third insert connection structure further comprises an insert slot (22) on the second board (2) and a pin (32) on the third board (3).

10. The board interlocking structure of claim 7, wherein each of the first insert connection structure, the second insert connection structure and the third insert connection structure is an integrated component of each of the first board (1), the second board (2) and the third board (3).

11. The board interlocking structure of claim 7, wherein, when the first board (1), the second board (2), and the third board (3) are in insert connection with one another, the third board (3) is configured to prevent relative displacement of the first board (1) relative to the second board (2) and the third board (3).

12. The board interlocking structure of claim 7, wherein the first insert connection structure is configured to allow the first (1) and second board (2) only to slide along the insertion direction; the second insert connection structure is configured to allow the first board (1) and third board (3) only to slide along the insertion direction; and the third insert connection structure is configured to allow the second board (2) and third board (3) only to slide along the insertion direction.

13. The board interlocking structure of claim 8, wherein the vertical retaining groove (11) and horizontal retaining groove (12) is one of a dovetail groove or a T-shaped groove.

14. A board interlocking structure, comprising:
a first board (1);
a second board (2); and
a third board (3),
wherein the first board (1), the second board (2) and the third board (3) are configured to interlock via at least a first insert connection structure, a second insert connection structure and a third insert connection structure that are integrally formed on each of the first board (1), the second board (2) and the third board (3), and
wherein the first insert connection structure between the first board (1) and the second board (2) allows the first (1) and second board (2) only to slide along an insertion direction, wherein the first insert connection structure further comprises:
a horizontal retaining groove (12) with an inward opening, the horizontal retaining groove (12) being one of a dovetail groove and a T-shape groove; and
a horizontal rib configured to form the first insert-connection structure with the horizontal retaining groove;
wherein the second insert connection structure between the first board (1) and the third board (3) allows the first board (1) and the third board (3) only to slide along the insertion direction; and
wherein the third insert connection structure between the second board (2) and the third board (3) allows the second board (2) and third board (3) only to slide along the insertion direction.

15. The board interlocking structure of claim 14, wherein, when the first board (1), the second board (2), and the third board (3) are in insert connection with one another, the third board (3) is configured to prevent relative displacement of the first board (1) relative to the second board (2) and the third board (3).

16. The board interlocking structure of claim 14, wherein the second insert connection structure further comprises a vertical retaining groove (11) on the first board (1) and a vertical rib (31) on the third board (3) and wherein the third insert connection structure further comprises an insert slot (22) on the second board (2) and a pin (32) on the third board (3).

17. The board interlocking structure of claim 16, wherein the first board (1), the second board (2) and the third board (3) are perpendicular to each other.

18. The board interlocking structure of claim 16, wherein at least one of the first board (1), the second board (2) and the third board (3) is not perpendicular to each other.

* * * * *